(12) United States Patent
Talpade et al.

(10) Patent No.: US 9,065,753 B2
(45) Date of Patent: Jun. 23, 2015

(54) LIGHTWEIGHT PACKET-DROP DETECTION FOR AD HOC NETWORKS

(75) Inventors: Rajesh R. Talpade, Madison, NJ (US); Anjum Farooq, Somerset, NJ (US)

(73) Assignee: TTI Inventions A LLC, Wilmington, DE (US)

( * ) Notice: Subject to any disclaimer, the term of this patent is extended or adjusted under 35 U.S.C. 154(b) by 1036 days.

(21) Appl. No.: 12/603,182

(22) Filed: Oct. 21, 2009

(65) Prior Publication Data

US 2010/0050258 A1    Feb. 25, 2010

Related U.S. Application Data

(63) Continuation of application No. 11/299,570, filed on Dec. 12, 2005, now Pat. No. 7,706,296.

(60) Provisional application No. 60/635,451, filed on Dec. 13, 2004.

(51) Int. Cl.
*H04L 12/26* (2006.01)
*H04L 12/24* (2006.01)
*H04L 29/06* (2006.01)
*H04W 12/12* (2009.01)
*H04W 40/00* (2009.01)
*H04W 84/18* (2009.01)

(52) U.S. Cl.
CPC .............. *H04L 43/16* (2013.01); *H04L 41/142* (2013.01); *H04L 43/067* (2013.01); *H04L 43/0829* (2013.01); *H04L 63/1425* (2013.01); *H04L 2463/143* (2013.01); *H04W 12/12* (2013.01); *H04W 40/00* (2013.01); *H04W 84/18* (2013.01)

(58) Field of Classification Search
CPC ................... H04L 2463/143; H04L 43/0829
USPC .................. 370/252, 254, 232, 235, 315
See application file for complete search history.

(56) References Cited

U.S. PATENT DOCUMENTS

| | | | |
|---|---|---|---|
| 2003/0115321 A1 | 6/2003 | Edmison et al. | |
| 2003/0236995 A1 | 12/2003 | Fretwell, Jr. | |
| 2004/0025018 A1* | 2/2004 | Haas et al. | 713/168 |
| 2004/0103282 A1 | 5/2004 | Meier et al. | |
| 2004/0123142 A1 | 6/2004 | Dubal et al. | |
| 2004/0199664 A1 | 10/2004 | Feldman et al. | |

(Continued)

FOREIGN PATENT DOCUMENTS

| | | |
|---|---|---|
| JP | 2001-077814 | 3/2001 |
| JP | 2001-257722 | 9/2001 |

(Continued)

OTHER PUBLICATIONS

Communication from the European Patent Office for European Patent Application 05858584.5, mailed Dec. 4, 2009.

(Continued)

*Primary Examiner* — Barry Taylor

(57) ABSTRACT

In packet-drop attacks in ad hoc networks, a malicious network node chooses to selectively drop packets that are supposed to be forwarded, which results in adverse impact on application good-put and network stability. A method and system for detection of packet-drop attacks in ad hoc networks requires network nodes to report statistics on IP flow packets originated, received, or forwarded to neighbors. These statistics are analyzed and correlated to determine nodes suspected of dropping packets.

31 Claims, 10 Drawing Sheets

(56) References Cited

U.S. PATENT DOCUMENTS

| | | | |
|---|---|---|---|
| 2005/0117513 A1* | 6/2005 | Park et al. | 370/230 |
| 2005/0165696 A1* | 7/2005 | Jakobsson et al. | 705/65 |
| 2005/0185666 A1* | 8/2005 | Raya et al. | 370/461 |
| 2005/0204028 A1* | 9/2005 | Bahl et al. | 709/223 |
| 2006/0004912 A1* | 1/2006 | Najam et al. | 709/213 |

FOREIGN PATENT DOCUMENTS

| | | |
|---|---|---|
| JP | 2004-336768 | 11/2004 |
| JP | 2005-184834 | 7/2005 |
| JP | 2005-286956 | 10/2005 |

OTHER PUBLICATIONS

Official Notice of Rejection for Japanese Patent Application 2007-546804 (with English translation), mailed Nov. 6, 2009.
Watanabe, RYu et al., "A Proposal and an Implementation of Misbehavior Detection Technique on Ad hoc Network," (English Abstract only), Technical Report of IEICE, vol. 104, No. 277, pp. 67-70, Aug. 27, 2004.
Official Notice of Rejection for Japanese Patent Application 2007-546804 (with English Translation), mailed Apr. 2, 2010.
David B. Johnson, David A. Maltz, and Josh Broch. DSR The Dynamic Source Routing Protocol for Multihop Wireless Ad Ho Networks. In Ad Hoc Network, edited by Charles E. Perkins, chapter 5, pp. 139-172. Addison-Wesley, 2001.
Farooq M. Anjum, "TCP Algorithms and Multiple Paths: Considerations for the Future of the Internet on Using Multiple Paths for a TCP Flow", Kluwer Sp. Issue 2003, pp. 1-20.
International Search Report and Written Opinion for PCT/US2005/44895 mailed Oct. 17, 2007.
R. Rao et al, "Detecting Malicious Packet Dropping Using Statistically Regular Traffic Patterns in Multihop Wireless Networks That Are Not Bandwidth Limited", Brazilian Journal of Telecommunications, 2003, pp. 1-7.
Sergio Marti et al, "Mitigating Routing Misbehavior in Mobile Ad Hoc Networks", Proceedings of the 6th Intl. Conference on Mobile Computing and Networking, Boston, MA, Aug. 2000, pp. 255-265.
Non-final Office Action for U.S. Appl. No. 11/299,570, mailed Jan. 21, 2009.
Final Rejection for U.S. Appl. No. 11/299,570, mailed Jul. 14, 2009.
Advisory Action for U.S. Appl. No. 11/299,570, mailed Sep. 10, 2009.
Notice of Allowance for U.S. Appl. No. 11/299,570, mailed Oct. 7, 2009.
Anjum F. et al., "LiPaD: Lightweight Packet Drop Detection for Ad Hoc Networks," Sep. 26, 2004 IEEE 60th Vehicular Technology Conference, vol. 2, pp. 1233-1237.
European Patent Office Communication for EP application 05858584.5, mailed Nov. 23, 2009.

* cited by examiner

- System Node
- Coordinator Node

| Unique-Flow-ID | Sampling-Start-Time | Liveness | Received-Packet-Count | Next-Hop-Structure |
|---|---|---|---|---|

Fig. 3

| | 1 | 2 | 3 | 4 | 5 | 6 | 7 | 8 | 9 |
|---|---|---|---|---|---|---|---|---|---|
| Report Received Packets | ✓ | ✓ | ↓ | ↓ | ↓ | ↑ | ↑ | ↑ | ✓ |
| Report Forwarded Packets | ↓ | ↑ | ✓ | ↓ | ↑ | ✓ | ↓ | ↑ | ↻ |

LIGHTWEIGHT PACKET-DROP DETECTION FOR AD HOC NETWORKS

CROSS-REFERENCE TO RELATED PATENT APPLICATIONS

This application is a Continuation of U.S. application Ser. No. 11/299,570, filed Dec. 12, 2005, incorporated herein by reference in its entirety, which claims priority from U.S. Provisional Application No. 60/635,451, filed Dec. 13, 2004, incorporated herein by reference in its entirety.

GOVERNMENT LICENSE RIGHTS

This invention was made with Government support under contract DAAD 19-01-C-0062 awarded by the U.S. Army Research Laboratory. The Government may have certain rights in this invention.

FIELD OF THE INVENTION

The present invention relates to detection of packet-drop attacks in ad hoc networks. Specifically, network nodes report statistics regarding IP flow packets originated, received, or forwarded to neighbors and then the statistics are analyzed and correlated to determine nodes suspected of dropping packets.

BACKGROUND OF THE INVENTION

Ad hoc networks are generally described as those comprised of mobile, wireless nodes, where any node is capable of forwarding IP packets. Such networks have been extensively studied over the last few years, and multiple routing and other protocols have been proposed for enabling configuration and communication. The mobile and wireless nature of ad hoc networks, coupled with the possibility of any node potentially having visibility to all network traffic, has implied that they are more susceptible to malicious attacks than wireline networks. Significant effort has been expended over the last few years on approaches for detecting, preventing, and recovering from attacks on ad hoc networks. A large proportion of this work has focused on attacks on routing protocols, since routing is a critical component of the ad hoc network infrastructure. An attack that has been studied, but not definitively addressed, and can be as damaging as routing attacks, is when malicious ad hoc network nodes selectively drop packets that are supposed to be forwarded. The presence of such a malicious packet dropping node can be detrimental to the network "good-put" even when using reliable transport protocols such as TCP. This is because the throughput of TCP flows is affected significantly when faced with packet loss rates of 5% or beyond. A malicious node could also drop critical control packets, resulting in adverse effects on the ad hoc network's stability. The problem of detecting such malicious nodes is complicated due to the wireless, and hence "lossy" nature of the network links as this blurs the distinction between malicious and accidental dropping.

Prior solutions have been designed for specific types of network traffic, and have made assumptions that are not reasonable for practical usage. Previous attempts to solve this problem have relied upon promiscuous monitoring of network links, which is not a practical assumption. This is because promiscuous monitoring suffers from various problems such as being resource intensive, being specific to a link layer technology, susceptible to evasion and insertion techniques and it is also not scalable.

In promiscuous mode, packets do not flow through the internet protocol suite (IPS). A sensor analyzes a copy of the monitored traffic rather than the actual forwarded packet. The advantage of operating in promiscuous mode is that the IPS does not affect the packet flow with the forwarded traffic. The disadvantage of operating in promiscuous mode, however, is the IPS cannot stop malicious traffic from reaching its intended target for certain types of attacks, such as atomic attacks (single-packet attacks). The response actions implemented by promiscuous IPS devices are post-event responses and often require assistance from other networking devices, for example, routers and firewalls, to respond to an attack. While such response actions can prevent some classes of attacks, for atomic attacks, however, the single packet has the chance of reaching the target system before the promiscuous-based sensor can apply an access control list (ACL) modification on a managed device (such as a firewall, switch, or router).

The present invention provides a scalable, effective and practical approach for detection of packet-drop attacks in ad hoc networks. The invention relies upon network nodes reporting statistics regarding IP flow packets originated, received, or forwarded to neighbors. These statistics are analyzed and correlated to determine nodes suspected of dropping packets.

SUMMARY OF THE INVENTION

The lightweight packet-drop (LiPaD) algorithm of the present invention requires ad hoc network nodes to track the number of IP packets received from and transmitted to their neighbors, for each IP flow transiting the node. A flow is defined by the source IP address and destination IP address tuple in the IP packet header. Flow statistics are periodically reported by network nodes to a coordinator node, which analyses the statistics in order to identify network nodes that are dropping packets. "Natural" packet losses due to link-layer issues are accounted for by the algorithm, since network nodes get ranked periodically according to their "badness" level. The algorithm can detect malicious nodes that do not report statistics accurately, and lie intentionally to the coordinator. Furthermore, the algorithm is effective even in case of dynamic ad hoc networks, when nodes move and traffic flows get re-routed as the routing protocol determines new paths. The algorithm can detect multiple packet-dropping nodes, and can operate even with encrypted traffic since it needs access to IP-level packet header information. There is no requirement for promiscuous link monitoring imposed by the algorithm.

The algorithm relies upon the following assumptions:

The threat is posed by one or more network nodes that have been taken over by an attacker, either physically or logically. The malicious node can selectively drop IP packets that are supposed to be forwarded by it. The malicious node can also provide incorrect information about the number of packets received and/or forwarded by it.

No promiscuous link-level monitoring is required by the algorithm. The capability to perform promiscuous monitoring depends on the link-layer characteristics and the link-layer encryption approach. Hence, promiscuous monitoring cannot be relied upon to provide the information necessary for the packet drop detection algorithm.

Nodes can view IP packet headers and collect statistics about traffic flows that pass through them. This assumption does not pose a problem for end-to-end encryption of traffic flows, since at the very least the IP packet headers have to be visible to intermediate nodes to permit proper forwarding.

IDS messages are end-to-end encrypted, and hence cannot be differentiated from general network traffic by intermediate nodes. This assumption prevents a malicious node from specifically dropping IDS messages.

Nodes use some guaranteed delivery mechanism (such as Reliable UDP, or application-level reliability) to transmit IDS messages to the coordinator node.

Nodes are loosely time-synchronized, and vary at most by a few seconds.

A principal object of the present invention is therefore, the provision of a method of detecting packet-drop attacks in ad hoc networks.

Another object of the present invention is the provision of a method of network nodes reporting statistics regarding IP flow packets originated, received, or forwarded to neighbors and then the statistics are analyzed and correlated to determine nodes suspected of dropping packets.

Further objects of the present invention will become more clearly apparent when the following description is read in conjunction with the accompanying drawings.

BRIEF DESCRIPTION OF THE DRAWINGS

FIG. 3 shows the flow database structure at each network node.

DETAILED DESCRIPTION OF THE PREFERRED EMBODIMENTS

Figure 1:
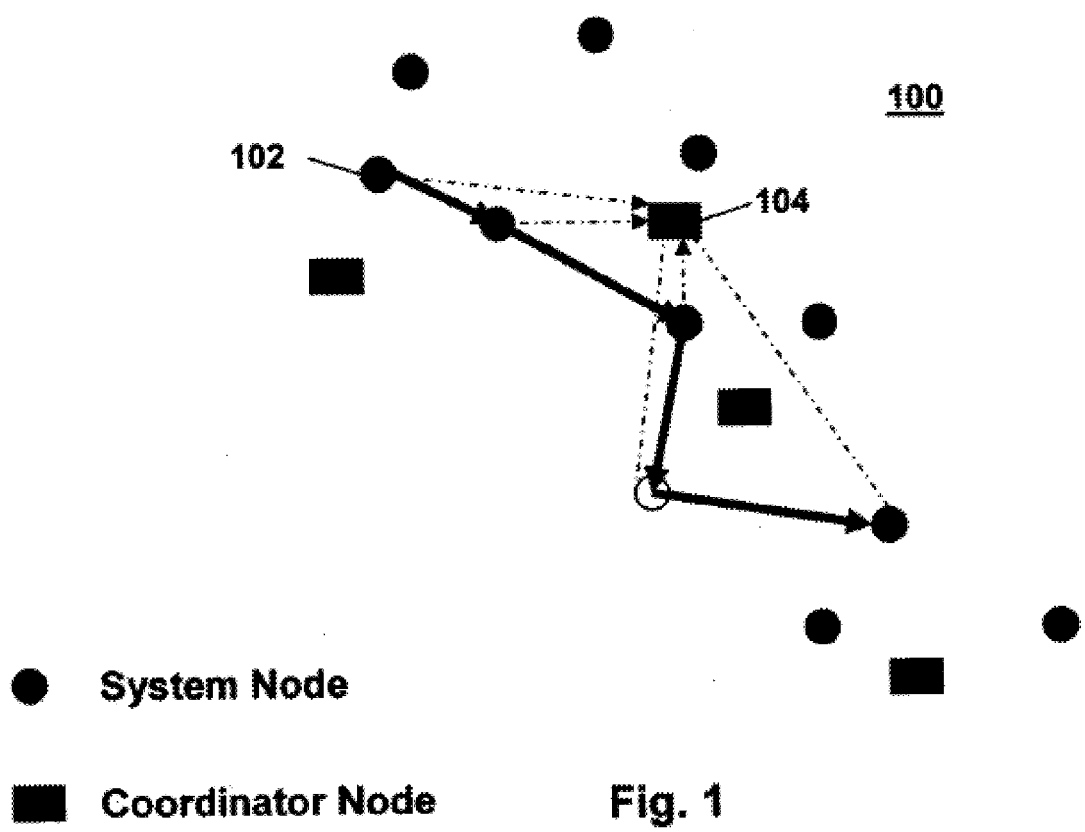
FIG. 1 is a schematic diagram of an ad hoc network showing system nodes and coordinators.

Network nodes execute the LiPaD algorithm and report on traffic flows passing through them. Referring to FIG. 1, every network node 102 on a path of flow in an ad hoc network 100 sends summarized information about the flow periodically to associated coordinator nodes 104. The coordinator node correlates the received information in order to determine any network nodes dropping packets.

The following terms are used in the LiPaD algorithm description.

Coordinator node: Node receiving reports from network nodes periodically, and analyzing the reports to determine malicious packet-dropping nodes.

Reporting-Time-Slot: Configurable period for nodes to send reports on flows to coordinator. Set to same value at all nodes in network.

Unique-Flow-ID: Each flow in the network is uniquely identified by concatenation of the source and destination IP addresses for the flow.

Sampling-Start-Time: The time when a node starts tracking a flow passing through it, during the current Reporting-Time-Slot.

Liveness: Timer used at network nodes to track non-active flows, and delete the non-active flows from the database. Set to same value at all nodes in the network.

Received-Packet-Count: Count of number of packets received by a node for a flow during current Reporting-Time-Slot.

Forwarded-Packet-Count: Count of number of packets forwarded by a node to a neighbor for a flow during current Reporting-Time-Slot.

Next-Hop-Structure: List of 2-tuples, with each 2-tuple indicating a next-hop neighbor's IP address (Next-Hop-IP) and the number of flow packets forwarded to it (Forwarded-Packet-Count) during the current Reporting-Time-Slot.

Suspect-Counter: Value used at coordinator to represent "maliciousness" of network node; the higher the value, the more malicious the node is considered to be.

Network-Node-List: List of network nodes maintained by coordinator node that includes Suspect-Counter for node.

Flow-List: List of flows and their statistics maintained by coordinator node, as reported by network nodes.

Flow-Node-List: List of network nodes reporting about a flow, in Flow-List at coordinator node. Each entry for network node comprises of Report-Duration, Received-Packet-Count, Next-Hop-Structure.

Report-Duration: Time during current Reporting-Time-Slot that flow was tracked by a node.

Flow-Timer: Timer used at coordinator node to allow for all network nodes to report about a specific flow, prior to processing the information received.

Permissible-Packet-Loss: Configurable threshold at coordinator to accommodate "natural" link-layer losses and thus reduce false-positives.

LiPaD-Timer: Timer used at coordinator node to periodically rank all network nodes in Network-Node-List by decreasing Suspect-Counter values.

Figure 2:
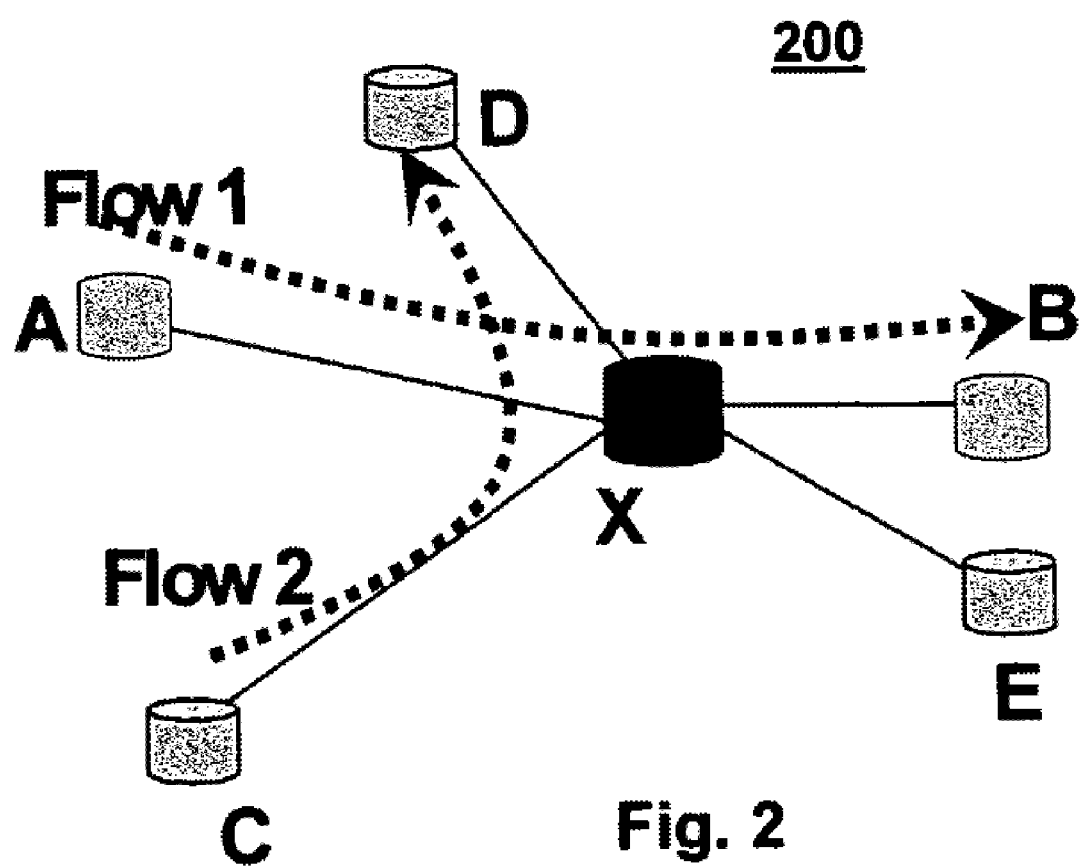
FIG. 2 is a schematic diagram of traffic flows in an ad hoc Network.

Credit-Value: Value used at coordinator to reward nodes that forward packets correctly. Set to last value used to punish the node in case of bad forwarding behavior The basic concept can be described with reference to FIG. 2, which illustrates 6 nodes A, B, C, D, E, and X that are part of an ad hoc network 200. Flow 1 transits through nodes A, X and B, while flow 2 transits through nodes C, X, and D. For flow 1, nodes A, X, and B generate reports on IP packets received and forwarded to their respective IP-level next hop (next-hop for A is X; for X is B); similarly for flow 2 and nodes C, X, and D (next-hop for C is X; for X is D). The reports are sent periodically (Reporting-Time-Slot) to a coordinator node, which currently is assumed to be a single node. However, it is possible that there are multiple active coordinator nodes in the network, each coordinator node being associated with a predetermined network node or network nodes. Based on the information in the received reports, the coordinator node rewards well-behaved nodes, and punishes misbehaving nodes. The coordinator periodically generates an ordered list of all network nodes based on their "suspect" value. Details of the algorithm at the network nodes and at the coordinator node are described below.

Algorithm at Ad Hoc Network Nodes

Each network node maintains a database of flows (defined by source and destination IP address) that transit or originate from the node. The database includes the information indicated in FIG. 3 for each flow. The Unique-Flow-ID (8 bytes) is derived from the source and destination IP address of the flow. The Sampling-Start-Time (4 bytes) indicates the time when the node started collecting data on the flow during the current Reporting-Time-Slot. Liveness (4 bytes) indicates the amount of time left to delete a flow from the database, and is reset every time a new packet is received for the flow. Received-Packet-Count (4 bytes) indicates the number of packets received for the flow by the node during the current Reporting-Time-Slot. Next-Hop-Structure (8 bytes per tuple) is a list of 2-tuples, with each 2-tuple indicating a next-hop neighbor's IP address (Next-Hop-IP) and the number of flow packets forwarded to it (Forwarded-Packet-Count) during the current Reporting-Time-Slot.

Flow Database Structure at each Network Node

Figure 4:
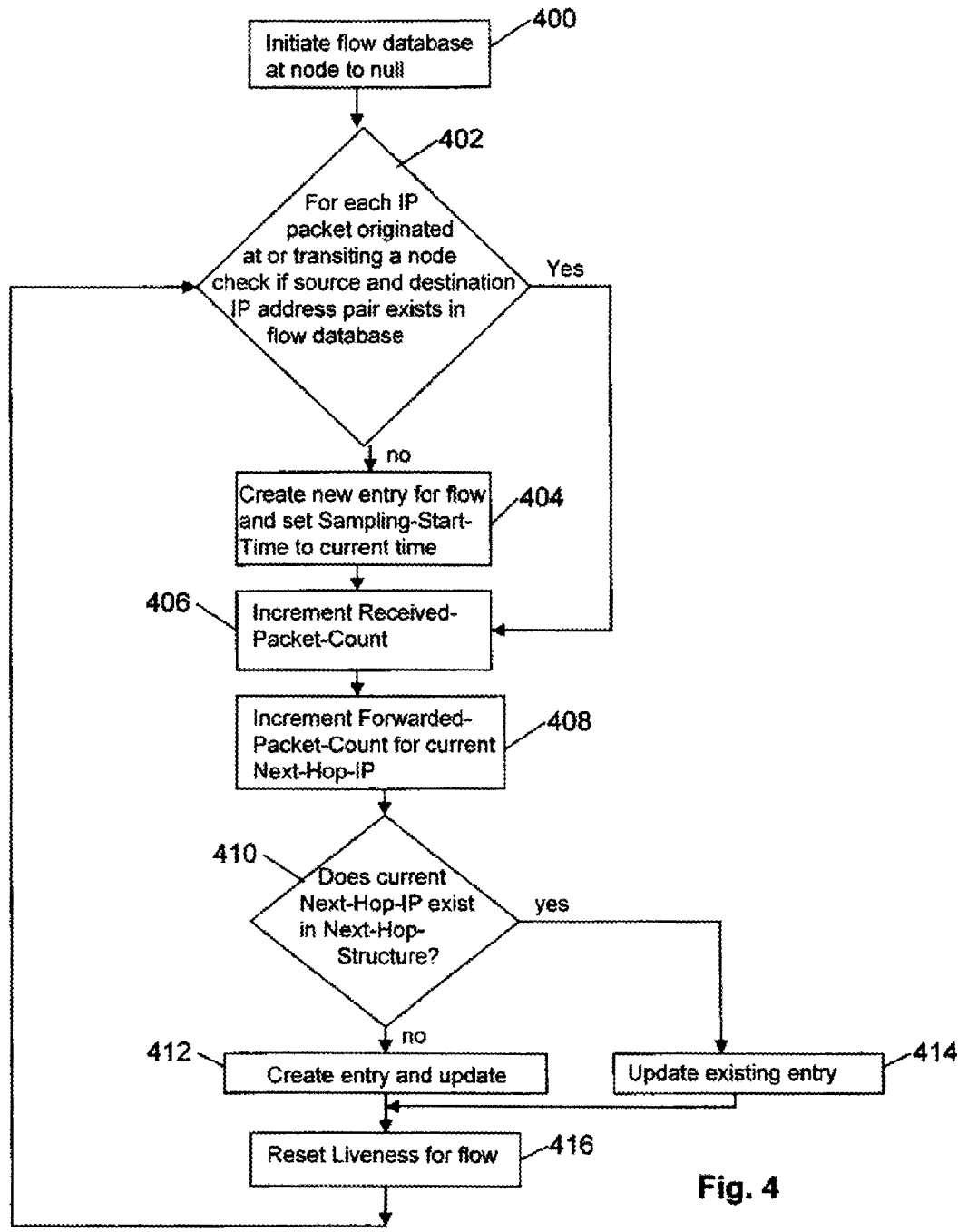
FIG. 4 is a flow diagram of a first portion of an algorithm at ad hoc network nodes.

The algorithm at each network node comprises two parts that execute in parallel. The first part of the algorithm, shown in FIG. 4, acts on each IP packet that is originated or transited through the node according to the following steps.

1. Initiate flow database at node to null 400.
2. For each IP packet originated at or transiting node
Check if source and destination IP address pair exists in flow database 402.
If flow does not exist
Create new entry for flow (defined by unique source and destination IP address pair); set Sampling-Start-Time to current time 404.
Increment Received-Packet-Count 406.
Increment Forwarded-Packet-Count for current Next-Hop-IP 408.
If current Next-Hop-IP does not exist in Next-Hop-Structure, create entry and update 412.
Else, update existing entry 414.
Reset Liveness for flow 416
Go to step 402.

Figure 5:
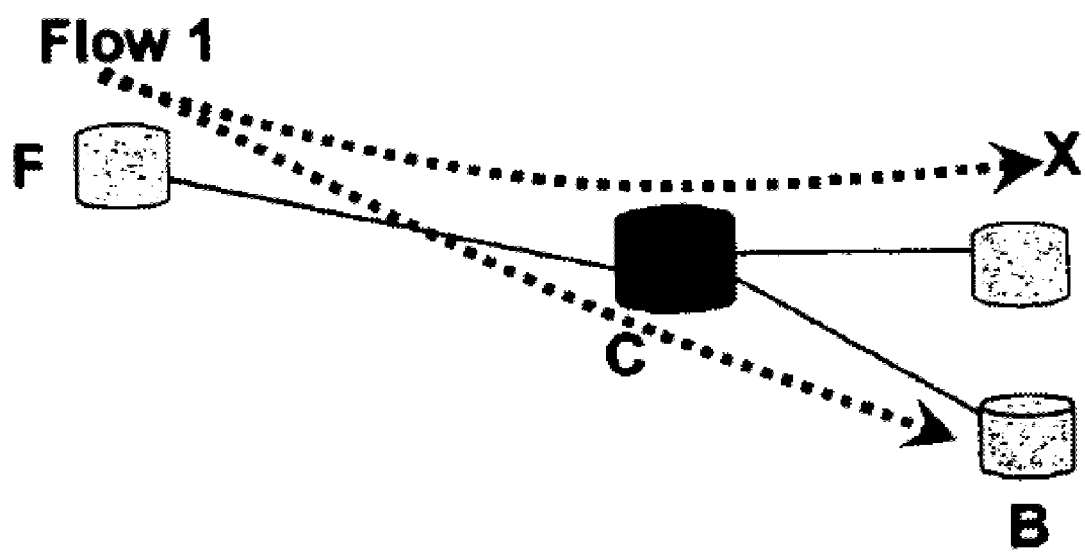
FIG. 5 is a schematic diagram of a route change handled by lightweight packet-drop.

The concept of the Next-Hop-Structure above is that network routing tables may change during a Reporting-Time-Slot, causing a node to forward packets of a flow to a different next-hop neighbors. In FIG. 5, Flow 1 is depicted as initially flowing through nodes F-C-X, and then changes to flow through nodes F-C-B. The Next-Hop-Structure ensures that a node tracks the number of packets forwarded to each next-hop neighbor during a Reporting-Time-Slot, and identifies the current next-hop neighbor using information in the local routing/forwarding table. Node C would track the Forwarded-Packet-Count in Next-Hop-Structure for X, and then continue to do the same for B after the route change. The Next-Hop-Structure also handles the case of a next-hop neighbor receiving packets for the same flow from different previous hops during the same Reporting-Time-Slot.

Figure 6:
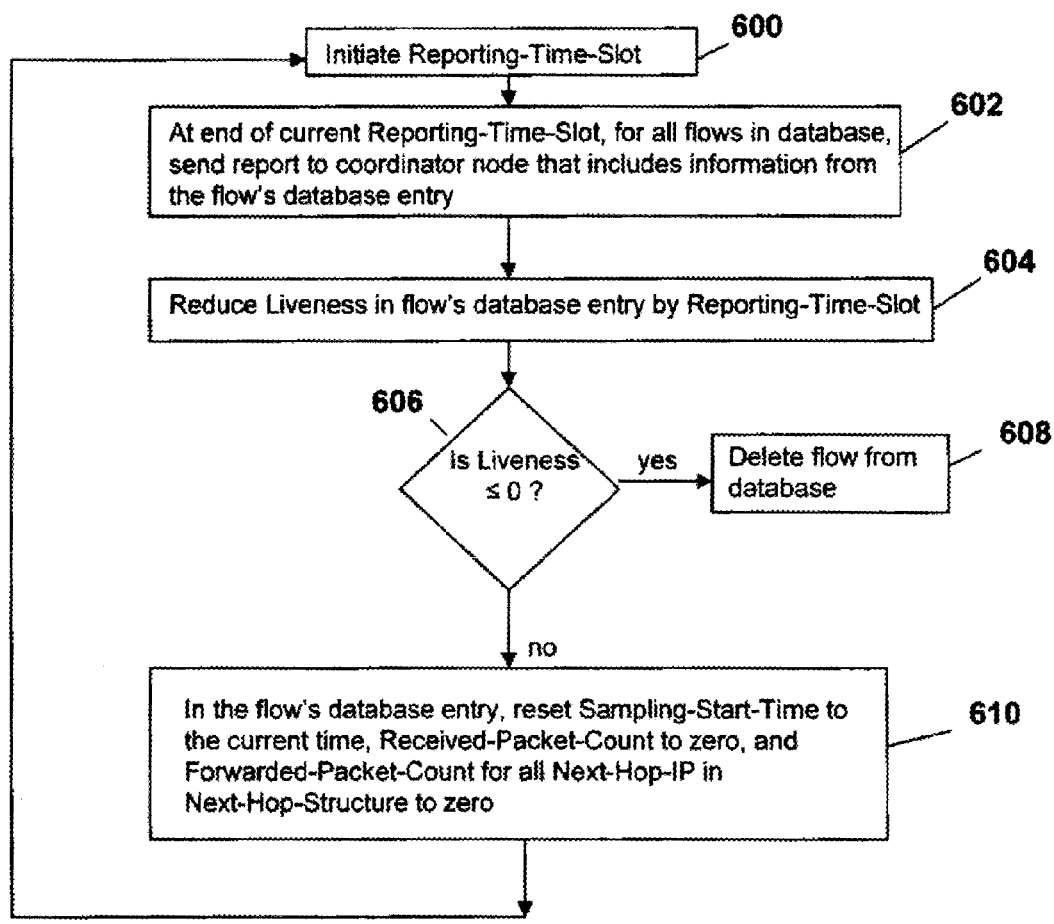
FIG. 6 is a flow diagram of a second portion of an algorithm at ad hoc network nodes.

The second part of the algorithm, shown in FIG. 6, is triggered at the end of each Reporting-Time-Slot, which has a uniform preconfigured value across all network nodes.

1. Initiate Reporting-Time-Slot 600.
2. When current Reporting-Time-Slot ends
For all flows in database
Send report to coordinator node that includes following information obtained from the flow's database entry 602: source and destination IP, Sampling-Start-Time, Received-Packet-Count, Next-Hop-Structure.
Reduce Liveness in flow's database entry by Reporting-Time-Slot 604.
If Liveness.Itoreq.zero 606, delete flow from database 608.
Else,
In the flow's database entry, reset Sampling-Start-Time to the current time, Received-Packet-Count to zero, Forwarded-Packet-Count for all Next-Hop-IP in Next-Hop-Structure to zero 610.
Go to step 600.

Reports for multiple flows can be aggregated and sent in as few IP packets as possible in order to avoid the per-packet header overhead if individual flow reports are sent in separate packets. Network bandwidth consumption due to flow reports can be further reduced by compressing the reports prior to its transmission. The coordinator node can decompress such a received report prior to further processing.

Algorithm at Coordinator Node

Figure 7:
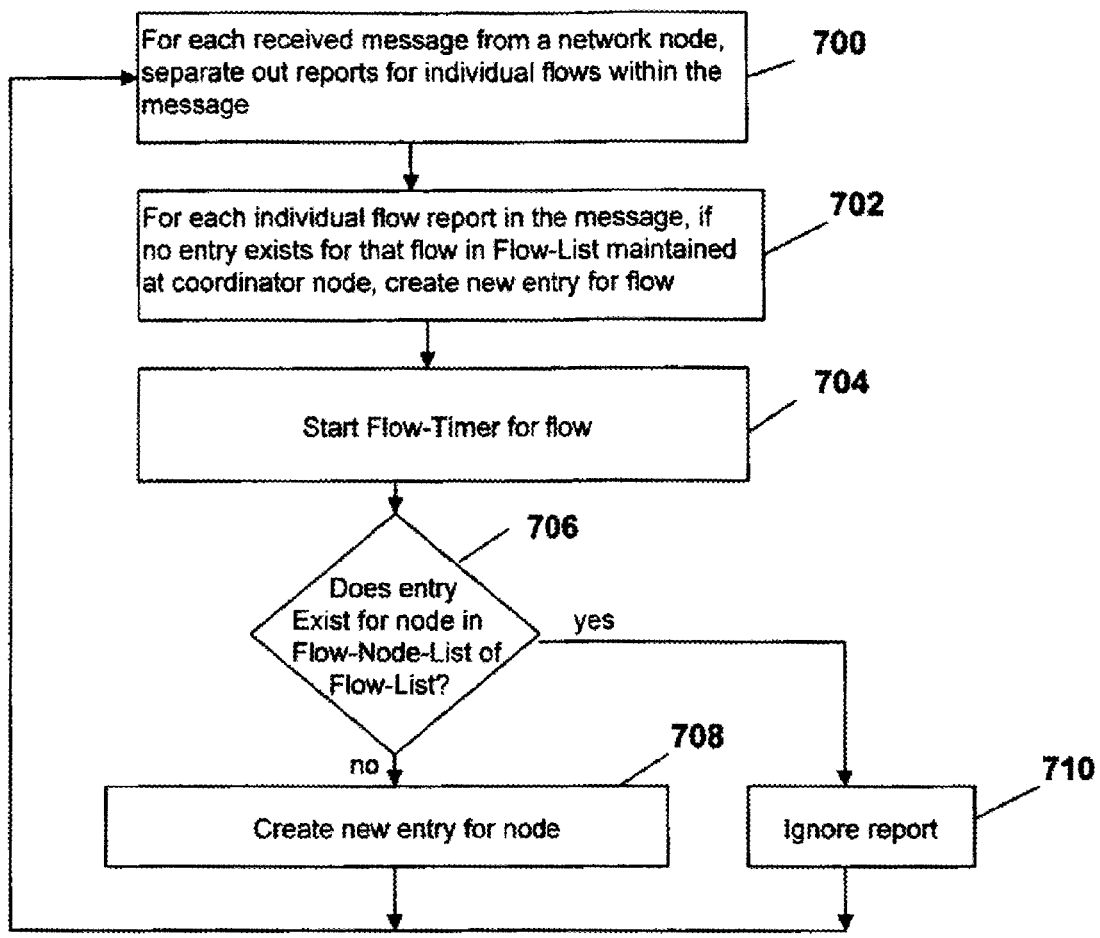
FIG. 7 is a flow diagram of a first part of an algorithm at a coordinator node for processing flow reports as they are received from network nodes.

A coordinator node receives reports from every network node periodically. It maintains information about nodes (Network-Node-List) in the network, with each node identified by a unique IP address. Each Network-Node-List entry includes the Suspect-Counter for the node, which is initially set to zero. In addition, the coordinator also maintains information on each flow (Flow-List) reported by the network nodes. The coordinator algorithm comprises three parts. The first part, shown in FIG. 7, processes flow reports as they are received from network nodes.

1. For each received message from a network node
Separate out reports for individual flows within message 700.
For each individual flow report in message
If no entry exists for that flow in Flow-List maintained at coordinator node
Create new entry for flow 702 (Each Flow-List entry includes a list of nodes (Flow-Node-List) that have sent reports about flow).
Start Flow-Timer for flow 704.
If no entry exists 706 for node in Flow-Node-List of Flow-List
Create new entry for node 708 (Each entry in Flow-Node-List has Report-Duration=(current time-Sampling-Start-Time), Received-Packet-Count, Next-Hop-Structure)
else if entry for node exists in Flow-Node-List, then ignore report since it is duplicate 710 (each node sends one report per flow during each Reporting-Time-Slot)
Go to step 700

Figure 8:
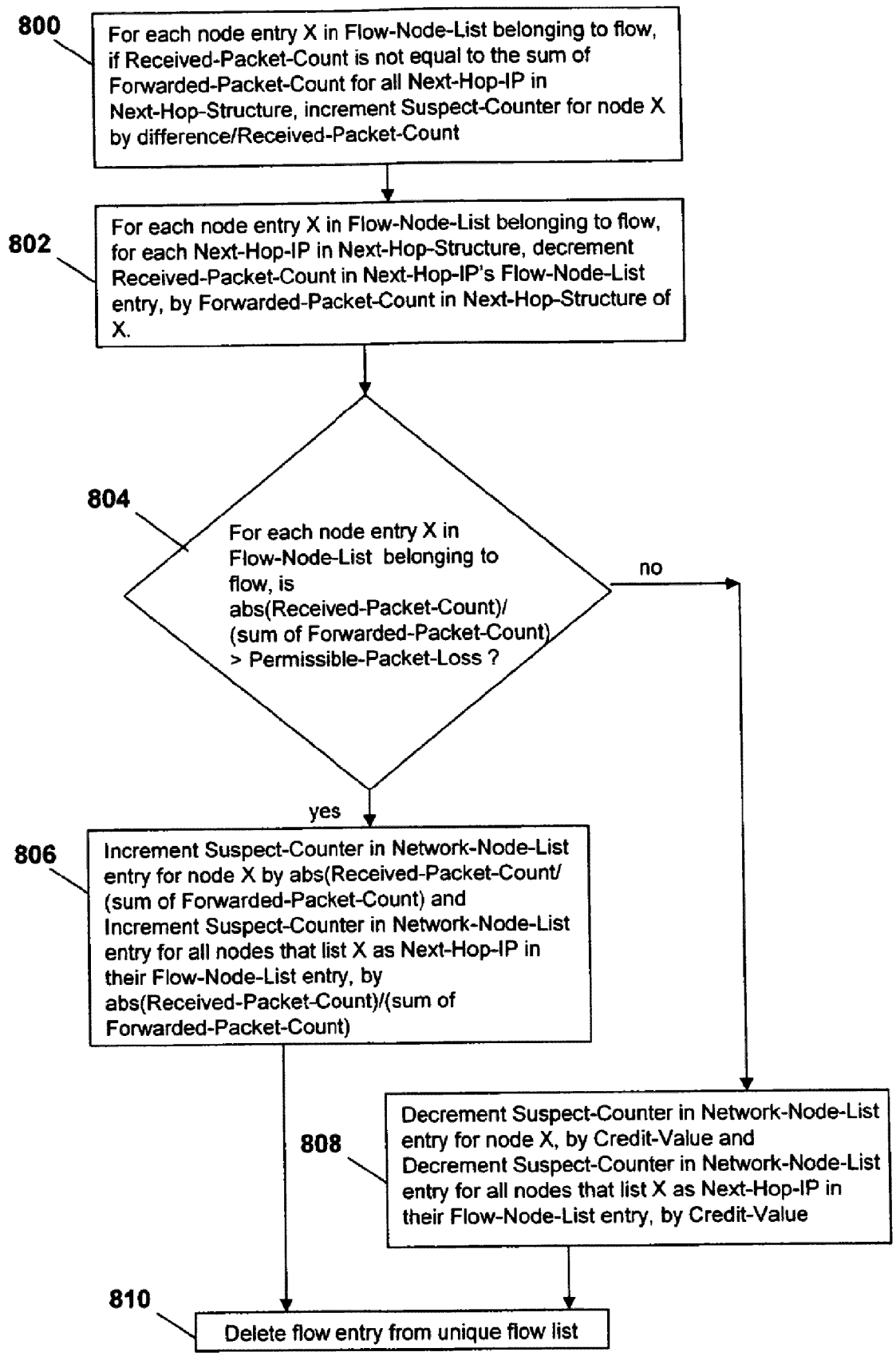
FIG. 8 is a flow diagram of a second part of an algorithm at a coordinator node that is triggered by the expiry of a Flow-Timer, which was started when the first report was received about the flow in the current.

The second part of the coordinator node algorithm, shown in FIG. 8, is triggered by the expiry of a Flow-Timer, which was started when the first report was received about the flow in the current Reporting-Time-Slot, as described above. The concept of having the Flow-Timer is to wait until all nodes have had a chance to report about that specific flow, and hence the Flow-Timer value can be influenced by the maximum message latency across the ad hoc network. Based on information available in the Flow-Node-List for the flow in the first part above, the coordinator compares the number of packets received and transmitted by a node to those indicated by its next-hop neighbors. Step 1 below handles the "truthful" node case, when a node does not forward all the flow packets that it receives and reports correctly about the number of packets received and forwarded. Thus, there is a mismatch between the number of packets received and number of packets forwarded to all next-hop neighbors, as reported by the node. The Suspect-Counter for the node in the Network-Node-List is incremented to reflect this behavior.

Step 2 below handles the case where there is a mismatch between the number of flow packets reported as transmitted by a node and the number of flow packets reported as received by its next-hop neighbors. This mismatch can be attributed to "natural" packet-loss, which is taken into account using a configurable threshold (Permissible-Packet-Loss). The other possibility is that either the node or one of its next-hop neighbors is lying by not reporting the actual number of flow packets forwarded or received respectively. This possibility will now be described along with steps 2 and 3 below.

When a Flow-Timer expires: 1. For each node entry X in Flow-Node-List belonging to flow If Received-Packet-Count is not equal to the sum of Forwarded-Packet-Count for all Next-Hop-IP in Next-Hop-Structure, increment Suspect-Counter for node X by difference/Received-Packet-Count 800.

2. For each node entry X in Flow-Node-List belonging to flow

For each Next-Hop-IP in Next-Hop-Structure, decrement Received-Packet-Count in Next-Hop-IP's Flow-Node-List entry, by Forwarded-Packet-Count in Next-Hop-Structure of X 802.

3. For each node entry X in Flow-Node-List belonging to flow

If abs(Received-Packet-Count)/(sum of Forwarded-Packet-Count)>Permissible-Packet-Loss 804

Increment Suspect-Counter in Network-Node-List entry for node X, by abs(Received-Packet-Count)/(sum of Forwarded-Packet-Count)

Increment Suspect-Counter in Network-Node-List entry for all nodes that list X as Next-Hop-IP in their Flow-Node-List entry, by abs (Received-Packet-Count)/(sum of Forwarded-Packet-Count) 806.

Else

Decrement Suspect-Counter in Network-Node-List entry for node X, by Credit-Value Decrement Suspect-Counter in Network-Node-List entry for all nodes that list X as Next-Hop-IP in their Flow-Node-List entry, by Credit-Value 808.

4. Delete flow entry from unique flow list 810.

Figure 9:
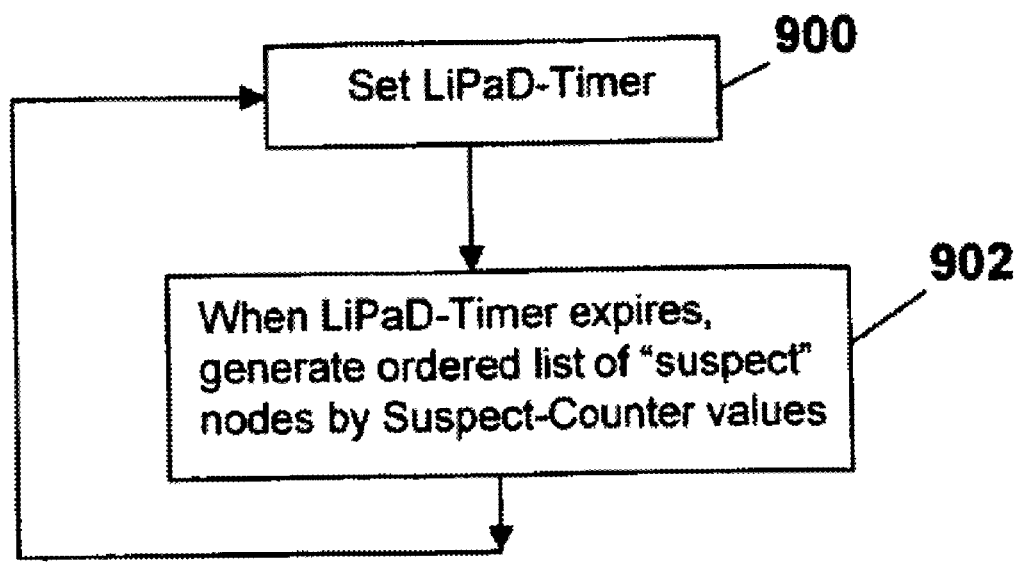
FIG. 9 is a flow diagram of a third part of an algorithm at a coordinator node which is triggered by a LiPaD-Timer

The third part of the coordinator node algorithm, shown in FIG. 9, is triggered by a LiPaD-Timer, which periodically goes through the Network-Node-List and ranks nodes by their Suspect-Counter values. The higher the Suspect-Counter, the more the node is likely to have dropped packets.

1. Set LiPaD-Timer 900.

When LiPaD-Timer expires, generate ordered list of "suspect" nodes by Suspect-Counter values 902.

Go to step 900.

Lying Nodes

Figure 10:
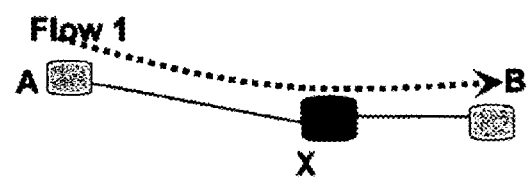
FIG. 10 is a schematic diagram of traffic flow in an ad hoc network with a malicious node and a table of actions that can be taken by a malicious node.

A sophisticated attacker that has taken over a network node may manage to manipulate the information reported to the coordinator node, in addition to dropping packets. The LiPaD algorithm can handle all cases of lying nodes, which are illustrated in FIG. 10. Node X is the malicious node that is dropping packets from Flow 1. It can lie in 9 distinct combinations about the number of packets received from A and forwarded to B. The symbol indicates that X is reporting the statistic accurately, the symbol indicates that X is reporting fewer packets than are actually received/forwarded, the symbol indicates that X is reporting more packets than are actually received/forwarded, and the symbol represents that X is reporting exactly the same number of packets to be forwarded as have been received. Case 9 is shown in FIG. 10.

In case 9, node X is the malicious node and is dropping packets of all flows passing through it. Node X is reporting correctly about the number of Flow 1 packets it receives from node A, but is reporting that the same number of Flow 1 packets is being forwarded by it to node B. This is incorrect since X is actually dropping some Flow 1 packets; i.e. X is lying. When the coordinator node analyzes the data from X and B, it will note the difference between number of packets reported as forwarded by X and number of packets reported as received by B. In this case, it is not possible to determine whether X is lying by reporting more packets than actually forwarded, or whether B is lying by reporting fewer packets than actually received. The LiPaD algorithm handles such cases by penalizing both X and B. This approach will adversely affect B if only one flow is considered. However, since there are other flows that pass through X or B, and since B can be expected to correctly forward packets belonging to those flows, B does not get penalized for flows that do not have X as their previous hop. Hence B's overall Suspect-Counter improves, while X's Suspect-Counter gets degraded for all flows passing through it. In fact, the LiPaD algorithm proactively rewards well-behaved nodes, which further improves the Suspect-Counter value for B as compared to that for X.

The LiPaD algorithm is a scalable, effective and practical algorithm for detection of packet-drop attacks in ad hoc networks. The approach requires nodes to report statistics on IP flow packets originated, received, or forwarded to neighbors. These statistics are analyzed and correlated to determine nodes suspected of dropping packets. The LiPaD algorithm is accurate in detecting multiple malicious packet-dropping nodes even in the presence of non-malicious "natural" link-loss that is comparable to malicious packet-drop rate, and when malicious nodes are lying by reporting incorrect statistics. The LiPaD algorithm maintains good detection accuracy with larger networks and node mobility.

While there has been described and illustrated lightweight packet-drop detection for Ad Hoc networks, it will be apparent to those skilled in the art that variations and modifications are possible without deviating from the broad principles and teachings of the present invention which shall be limited solely by the scope of the claims appended hereto.

What is claimed is:

1. A method for determining nodes suspected of dropping packets, the method comprising:

creating statistics at a network node in a network, wherein the statistics correspond to a flow of Internet Protocol (IP) packets received at or transmitted from the network node, and wherein the statistics include information related to neighboring nodes, the information comprising an IP address of a neighboring node and a number of IP packets transmitted from the network node to the neighboring node during a first time period; and transmitting the statistics from the network node to a coordination node for determining network nodes suspected of dropping packets, wherein the coordination node maintains a suspect-counter entry for each of a plurality of network nodes, and wherein the suspect-counter entry indicates a likelihood that a respective network node is dropping packets, wherein the coordination node is configured to compare a first number of IP packets received by the respective network node and a second number of IP packets transmitted by the respective network node to a third number of IP packets received by a first neighboring node and a fourth number of IP packets transmitted by a second neighboring node, and increment a first suspect-counter entry for the respective network node and a second suspect-counter entry for the neighboring node if the number of IP packets transmitted from the respective network node to the neighboring node is not equal to a statistic received from the neighboring node indicating a number of IP packets received at the neighboring node.

2. The method of claim 1, wherein the statistics include a unique flow identification corresponding to a source address of the IP packets and a destination address of the IP packets in the flow.

3. The method of claim 1, wherein the statistics include the number of IP packets received at the network node.

4. The method of claim 1, wherein the statistics include a time when the network node begins collecting data on the flow.

5. The method of claim 1, further comprising storing the statistics in a database maintained by the network node.

6. The method of claim 5, further comprising incrementing a statistic corresponding to a number of IP packets received at the network node in response to receiving an IP packet at the network node, wherein the statistic corresponding to the number of IP packets received at the network node is stored in the database.

7. The method of claim 5, further comprising incrementing the number of IP packets transmitted from the network node to the neighboring node in response to transmitting an IP packet from the network node to the neighboring node.

8. The method of claim 5, further comprising resetting a timer corresponding to a second time period for which the flow is non-active.

9. The method of claim 5, further comprising resetting the statistics in the database corresponding to the flow after the statistics are transmitted to the coordination node.

10. The method of claim 1, wherein the transmitting the statistics is performed after the first time period has ended.

11. A network node comprising:
a processor configured to create statistics corresponding to a flow of Internet Protocol (IP) packets received at or transmitted from the network node, and wherein the statistics include information related to neighboring nodes, the information comprising an IP address of a neighboring node and a number of IP packets transmitted from the network node to the neighboring node during a first time period; and
a transmitter configured to transmit the statistics from the network node to a coordination node for determining network nodes suspected of dropping packets, wherein the coordination node maintains a suspect-counter entry for each of a plurality of network nodes, and wherein the suspect-counter entry indicates a likelihood that a respective network node is dropping packets, wherein the coordination node is configured to compare a first number of IP packets received by the respective network node and a second number of IP packets transmitted by the respective network node to a third number of IP packets received by a first neighboring node and a fourth number of IP packets transmitted by a second neighboring node, and increment a first suspect-counter entry for the respective network node and a second suspect-counter entry for the neighboring node if the number of IP packets transmitted from the respective network node to the neighboring node is not equal to a statistic received from the neighboring node indicating a number of IP packets received at the neighboring node.

12. The network node of claim 11, wherein the statistics include a unique flow identification corresponding to a source address of an IP packet and a destination address of the IP packet.

13. The network node of claim 11, wherein the statistics include the number of IP packets received at the network node.

14. The network node of claim 11, wherein the statistics include a time when the network node begins collecting data on the flow.

15. The network node of claim 11, further comprising storing the statistics in a database maintained by the network node.

16. The network node of claim 15, wherein the processor is further configured to increment a statistic corresponding to a number of IP packets received at the network node in response to receiving an IP packet at the network node, wherein the statistic corresponding to the number of IP packets received at the network node is stored in the database.

17. The network node of claim 15, wherein the processor is further configured to increment the number of IP packets transmitted from the network node to the neighboring node in response to transmitting an IP packet from the network node to the neighboring node.

18. The network node of claim 15, wherein the processor is further configured to reset a timer corresponding to a second time period for which the flow is non-active.

19. The network node of claim 15, wherein the processor is further configured to reset the statistics in the database corresponding to the flow after the statistics are transmitted to the coordination mode.

20. The network node of claim 11, wherein the transmitter is further configured to transmit the statistics after the first time period has ended.

21. A method comprising:
receiving statistics at a coordination node from a network node in a network, wherein the statistics correspond to a flow of Internet Protocol (IP) packets received at or transmitted from the network node, and wherein the statistics include information related to neighboring nodes, the information comprising an IP address of a neighboring node and a number of IP packets transmitted from the network node to the neighboring node during a time period; and
analyzing the statistics to determine network nodes suspected of dropping packets, wherein the coordination node maintains a suspect-counter entry for each of a plurality of network nodes, and wherein the suspect-counter entry indicates a likelihood that a respective network node is dropping packets, wherein the analyzing the statistics comprises comparing a first number of IP packets received by the respective network node and a second number of IP packets transmitted by the respective network node to a third number of IP packets received by a first neighboring node and a fourth number of IP packets transmitted by a second neighboring node, and incrementing a first suspect-counter entry for the respective network node and a second suspect-counter entry for the neighboring node if the number of IP packets transmitted from the respective network node to the neighboring node is not equal to a statistic received from the neighboring node indicating a number of IP packets received at the neighboring node.

22. The method of claim 21, further comprising incrementing a suspect-counter entry for the network node if the number of IP packets received by the network node is not equal to a number of IP packets transmitted to neighboring nodes.

23. The method of claim 21, further comprising decrementing the first suspect-counter entry for the respective network node and the second suspect-counter entry for the neighboring node if the number of IP packets transmitted from the respective network node to the neighboring node is equal to a statistic received from the neighboring node indicating a number of IP packets received at the neighboring node.

24. The method of claim 21, further comprising ranking the plurality of network nodes according to the suspect-counter entry for each of the plurality of network nodes.

25. A coordination node comprising:
a receiver configured to receive statistics from a network node, wherein the statistics correspond to a flow of Internet Protocol (IP) packets received at or transmitted from the network node, and wherein the statistics include information related to neighboring nodes, the information comprising an IP address of a neighboring node and a number of flow packets transmitted from the network node to the neighboring node during a time period; and
a processor configured to analyze the statistics to determine network nodes suspected of dropping packets, wherein the processor is configured to maintain a suspect-counter entry for each of a plurality of network nodes at a database, and wherein the suspect-counter entry indicates a likelihood that a respective network node is dropping packets, wherein the processor is configured to compare a first number of IP packets received by the respective network node and a second number of IP packets transmitted by the respective network node to a third number of IP packets received by a first neighboring node and a fourth number of IP packets transmitted by a second neighboring node, and increment a first suspect-counter entry for the respective network node and a second suspect-counter entry for the neighboring node if the number of IP packets transmitted from the respective network node to the neighboring node is not equal to a statistic received from the neighboring node indicating a number of IP packets received at the neighboring node.

26. The coordination node of claim 25, wherein the processor is configured to increment a suspect-counter entry for the network node if the number of IP packets received by the network node is not equal to a number of IP packets transmitted to neighboring nodes.

27. The coordination node of claim 25, wherein the processor is configured to decrement the first suspect-counter entry for the network node and the second suspect-counter entry for the neighboring node if the number of IP packets transmitted from the respective network node to the neighboring node is equal to a statistic received from the neighboring node indicating a number of IP packets received at the neighboring node.

28. The coordination node of claim 25, wherein the processor is configured to rank the plurality of network nodes according to the suspect-counter entry for each of the plurality of network nodes.

29. A system for determining nodes suspected of dropping packets in a network, the system comprising:
a plurality of network nodes configured to report statistics corresponding to a flow of Internet Protocol (IP) packets received at or transmitted from each of the plurality of network nodes, and wherein the statistics include information related to neighboring nodes, the information comprising an IP address of a neighboring node and a number of IP packets transmitted from each of the plurality of network nodes to the neighboring node during a time period; and
a coordination node configured to receive the statistics from each of the plurality of network nodes and analyze the statistics to determine network nodes suspected of dropping packets, wherein the coordination node is configured to compare a first number of IP packets received by a first network node of the plurality of network nodes and a second number of IP packets transmitted by the first network node to a third number of IP packets received by a first neighboring node and a fourth number of IP packets transmitted by a second neighboring node, and increment a first suspect-counter entry for a first network node and a second suspect-counter entry for the neighboring node if the number of IP packets transmitted from the first network node to the neighboring node is not equal to a statistic received from the neighboring node indicating a number of IP packets received at the neighboring node.

30. The system of claim 29, wherein the coordination node is configured to maintain a suspect-counter entry at a database for each of the plurality of network nodes, and wherein the suspect-counter entry indicates a likelihood that a respective network node is dropping packets.

31. The system of claim 30, wherein the coordination node is configured to increment a suspect-counter entry for the first network node of the plurality of network nodes if a number of IP packets received by the first network node is not equal to a number of IP packets transmitted to neighboring nodes.

* * * * *